April 13, 1965     J. HEZLER, JR     3,178,231

WHEEL COVER

Filed June 6, 1963

INVENTOR.
Julius Hezler, Jr.
BY
W. S. Pettigrew
ATTORNEY

United States Patent Office 3,178,231
Patented Apr. 13, 1965

3,178,231
WHEEL COVER
Julius Hezler, Jr., East Detroit, Mich., assignor to General Motors Corporation, Detroit, Mich., a corporation of Delaware
Filed June 6, 1963, Ser. No. 285,987
4 Claims. (Cl. 301—37)

This invention relates to wheel covers and more particularly to a one-piece wire wheel-simulating wheel cover.

One feature of this invention is that it provides a new and improved wire wheel-simulating wheel cover including a plurality of spoke elements extending between an outer ring element and an inner hub element. Another feature of this invention is that the spoke elements are formed integrally with the ring element and the hub element to provide a one-piece wheel cover structure of relatively simple and economical manufacture. A further feature of this invention is that the wheel cover is formed of translucent or transparent plastic material so that a light-reflective coating applied to interior surfaces of the cover will cause the cover to appear as being completely bright-plated when viewed from the exterior thereof. Still another feature of this invention is that a transparent protective cover element is provided over the exposed surfaces of the various elements of the wheel cover to prevent the collection of dirt and dust thereon, to insure that the bright-plated appearance of the wheel cover is retained, and to provide for easy cleaning in use.

These and other features and advantages of the wheel cover of this invention will be apparent from the following specification and drawings wherein.

Figure 1:
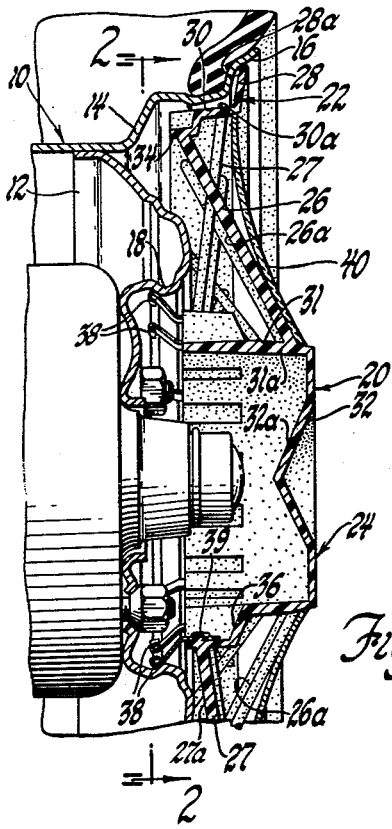
FIGURE 1 is a fragmentary sectional view of a wheel cover according to this invention in assembled relationship with a vehicle wheel.
Figure 2:
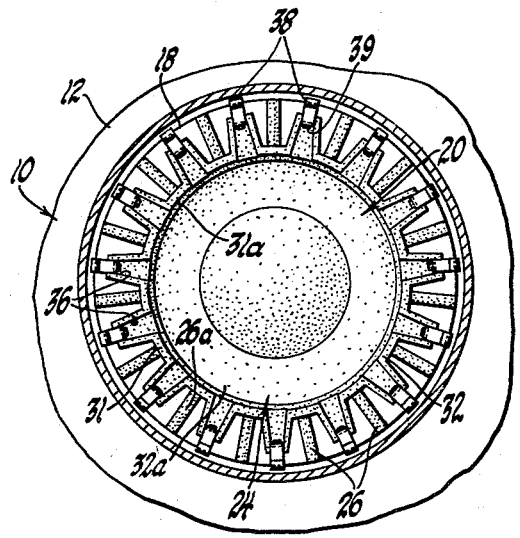
FIGURE 2 is an enlarged partial sectional view taken generally along the plane indicated by line 2—2 of FIGURE 1.

Referring now particularly to FIGURE 1 of the drawings, a vehicle wheel 10 of conventional construction includes a load supporting wheel body 12 and a drop-center type wheel rim 14. The rim 14 includes adjacent its outer edge a generally radially outwardly extending terminal flange structure 16 and the nose portion of the wheel body includes a generally radially inwardly directed annular rib 18.

Figure 3:
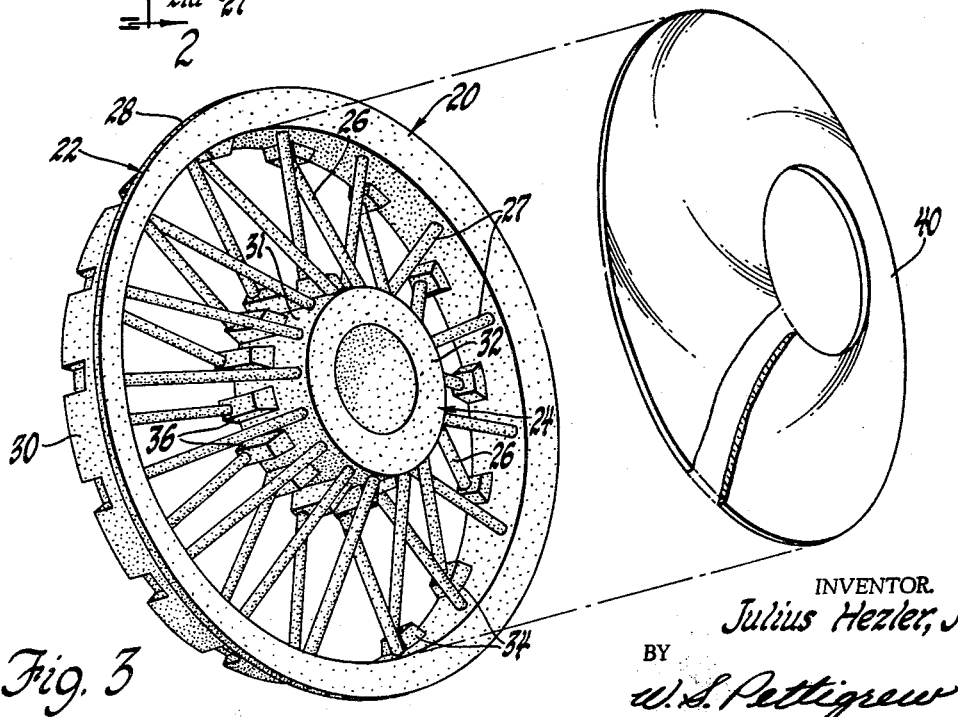
FIGURE 3 is an exploded perspective view.

As seen best in FIGURE 3, a wire wheel-simulating wheel cover 20 of translucent or transparent plastic self-sustaining material generally includes an outer ring element 22, an inner hub element 24, and a plurality of integral rod-like crossed spoke elements 26 and 27 which extend generally radially between the ring and the hub. Ring 22 includes a radially extending annular flange 28 joined to an axially extending annular flange 30. Hub 24 is generally cup-shaped in section and includes an annular side wall 31 joined to a face 32 provided with a decorative conical depression. Spokes 26 extend from adjacent the inner edge of flange 30 to wall 31 adjacent the face 32, and spokes 27 extend from flange 30 adjacent flange 28 to adjacent the inner edge of wall 31 of the hub.

The spokes are formed integral with the ring and hub, with the radially outer ends of the spokes 26 terminating at radially inwardly extending box-like structures or projections 34 formed integral with flange 30 of the ring, and with the radially inner ends of the spokes 27 terminating at similar box-like structures or projections 36 formed integrally with the wall 31 of hub 24. The structures 34 and 36 strengthen the ring 22 and the hub 24, respectively, and cooperate with the cross relationship of the spokes 26 and 27 and establish a substantially rigid relationship between the ring and the hub.

As shown in FIGURE 1, cover 20 is releasably secured to wheel 10 by a plurality of gripping fingers 38 of spring steel or other suitable material which engage behind rib 18 of the wheel body to hold flange 28 in engagement with the flange structure 16. Fingers 38 are secured to walls of structures 36 by deforming integral pins or lugs 39 thereof over the apertured ends of the fingers.

As previously set forth, wheel cover 20 is formed of material suitable for the integral fabrication of the various elements thereof, namely, the ring, hub and spokes. It is also contemplated in this invention that the cover 20 is formed of translucent or transparent plastic material and that a light-reflective coating is to be applied to various interior surfaces thereof so that the cover appears as a completely bright-plated article when viewed from the exterior thereof.

A light-reflective coating is applied to the inner surfaces 28a and 30a of ring 22, surfaces 26a and 27a of spokes 26 and 27, and surfaces 31a and 32a of hub 24. With reference to the inner surfaces 26a and 27a, it is to be understood that the spokes may be of any desired cross section, and therefore the inner or coated surfaces of each spoke is meant to be that which is comprised of those portions of the surface that face more inwardly of the wheel cover than outwardly thereof.

To insure that the wheel cover will retain its bright-plated appearance, a protective transparent dish-shaped cover 40 having a central aperture complementary to the outer dimension of hub 24 is secured by cement or other means to the hub and to the inner edge of flange 28. The cover prevents the accumulation of dirt, dust, etc., on the exterior surfaces of the coated wheel cover elements so that the effect created by the coating will not be destroyed.

Thus a new and improved wheel cover is provided.

I claim:

1. A wire wheel-simulating wheel cover comprising, an outer ring element, an inner hub element, a plurality of spoke elements extending between said ring element and said hub element, said ring element, said hub element and said spoke elements being formed integrally with each other, and a transparent cover element overlying and extending radially between said ring element and said hub element to cover said integrally formed elements.

2. A wire wheel-simulating wheel cover comprising, an outer ring element, an inner hub element, and a plurality of rod-like spoke elements circumferentially spaced along said ring element and extending generally radially inwardly therefrom to said hub element, each of said spoke elements being formed integrally at one end thereof with said ring element and integrally at the other end thereof with said hub element, said spoke elements being arranged in at least two circumferential rows, each element of each row being spaced from a successive element of that row by a spoke element of the other row.

3. A wire wheel-simulating wheel cover comprising, an outer ring element, an inner hub element, a plurality of rod-like spoke elements circumferentially spaced along said ring element and extending generally radially inwardly therefrom to said hub element, said ring element, said hub element and said spoke elements being formed integrally with each other, and a dish-shaped element of transparent material overlying and extending radially between said ring element and said hub element to cover said spoke elements.

4. A wire wheel-simulating wheel cover, comprising, an outer ring element, an inner hub element, a plurality of rod-like spoke elements circumferentially spaced along said ring element and extending radially inwardly therefrom to said hub element, said ring element, said hub element and said spoke elements being formed integrally with each other of transparent material, said ring element, said hub element and said spoke elements having a light-reflective coating applied to a surface thereof to give the appearance of being completely bright-plated when viewed from the opposite surface thereof, and a dish-shaped member of transparent material overlying said hub element and said ring element and extending radially therebetween to cover said opposite surface of said spoke elements.

References Cited by the Examiner

UNITED STATES PATENTS

| | | | |
|---|---|---|---|
| 2,593,274 | 4/52 | Dandurand | 301—108 |
| 2,755,141 | 7/56 | Lyon | 301—37 |
| 2,902,316 | 9/59 | Black | 301—37 |
| 2,997,344 | 8/61 | Whiteman | 301—37 |

ARTHUR L. LA POINT, *Primary Examiner.*